United States Patent
Taylor

Patent Number: 5,864,434
Date of Patent: Jan. 26, 1999

[54] PLASTIC MIRRORS HAVING ENHANCED THERMAL STABILITY

[75] Inventor: Christopher D. Taylor, Redondo Beach, Calif.

[73] Assignee: Raytheon Company, El Segundo, Calif.

[21] Appl. No.: 674,466

[22] Filed: Jul. 2, 1996

Related U.S. Application Data

[63] Continuation of Ser. No. 372,469, Jan. 13, 1995, abandoned.

[51] Int. Cl.$^6$ .............. G02B 5/08; G02B 7/182; G02B 5/26; G02B 5/22
[52] U.S. Cl. .............. 359/883; 359/884; 359/885
[58] Field of Search .............. 359/883, 884, 359/845, 360, 584, 848, 585

[56] References Cited

U.S. PATENT DOCUMENTS

| | | | |
|---|---|---|---|
| 3,609,589 | 9/1971 | Hufnagel | 372/99 |
| 3,769,770 | 11/1973 | Berner et al. | 152/404.1 |
| 4,214,818 | 7/1980 | Choyke et al. | 359/884 |
| 4,279,244 | 7/1981 | McAlister | 126/450 |
| 4,287,421 | 9/1981 | DeBaryshe | 250/423 P |
| 4,364,637 | 12/1982 | Ohno et al. | 359/884 |
| 4,451,119 | 5/1984 | Meyers et al. | 359/883 |
| 4,471,999 | 9/1984 | Brown | 301/64.7 |
| 4,856,887 | 8/1989 | Wakugawa et al. | 359/883 |
| 4,915,494 | 4/1990 | Shipley et al. | 359/883 |

FOREIGN PATENT DOCUMENTS

| | | |
|---|---|---|
| A-57-081201 | 5/1981 | Japan . |
| A-57-096301 | 6/1982 | Japan . |
| A-58-214103 | 12/1983 | Japan . |

Primary Examiner—Cassandra Spyrou
Assistant Examiner—Mohammad Y. Sikder
Attorney, Agent, or Firm—Colin M. Raufer; Leonard A. Alkov; Glenn H. Lenzen, Jr.

[57] ABSTRACT

A mirror having improved resistance to heat distortion and loss of dimensional stability when exposed to heat radiation. The mirror has a substrate of glass or plastic having front and back surfaces which can be of similar or different shape, and is coated with similar or dissimilar low-emissivity reflected layers on both surfaces. Radiation is reflected by the back surface (away from the mirror) thereby reducing amount of energy which is absorbed at the back surface of the mirror. This equalizes the temperature through the mirror and reduces thermally included warping of the mirror.

9 Claims, 1 Drawing Sheet

PLASTIC MIRRORS HAVING ENHANCED THERMAL STABILITY

This is a continuation application Ser. No. 08/372,469 filed Jan. 13, 1995, now abandoned.

BACKGROUND OF THE INVENTION

The present invention relates to the manufacture of mirrors, including inexpensive, lightweight mirrors having molded plastic substrates, and more particularly to increasing the thermal stability and resistance to distortion of such mirrors in the pressure at thermal variations and exposure to thermal radiation. Mirrors utilizing this invention can be used at any wavelength in particular for infrared application between 7 and 14 microns.

Precision mirrors require a specified mirror shape, such as flat, spherical or other contoured shape, to be maintained to a high degree of accuracy. The degree of precision required varies depending on the application. For the present mirrors, accuracies of 0.1 to 20 wavelengths of HeNe Light ($\lambda$=0.6328 microns) are typical. In order to beneficially use the energy incident on a mirror it must be reflected to the greatest degree practical. A mirror coating is used for this purpose. Requirements for reflectance typically vary from 85 to 99% depending upon the application and wavelength region. These coatings, by definition, have a low emissivity since emissivity can be no greater than 1-reflectivity. Since absorption and emissivity are related, a low reflectivity (no coating) surface would have a high emissivity and therefore be highly absorbing of incident energy. The reduction of this absorption provides the basis for the present invention.

Absorbed radiative energy on the back (non mirror) side can generate thermal gradients caused by non-uniform heating resulting from the mismatch in energy being absorbed by the high emissivity (uncoated) back surface of the mirror substrate, of glass or molded plastic, and the low emissivity reflective coating on the front surface of the mirror substrate.

Non-uniform heating can result in a thermal gradient which can warp the mirror substrate or cause a loss of dimensional stability, and thereby distort the mirror figure and reflected light. This effect can occur with any mirror substrate, including glass, but is particularly pronounced with molded plastic mirror substrates because they are particularly sensitive to thermal problems associated with a low thermal conductivity and a high temperature coefficient of expansion (CTE) as is inherent in most plastics. Therefore while molded plastic mirror substrates provide low cost, lightweight alternatives to glass mirror substrates, they are much more susceptible to warpage and distortion caused by thermal gradients and therefore have been unsatisfactory for use in precision mirrors, particularly those used in heat build-up or radiant energy conditions.

SUMMARY OF THE INVENTION

The present invention relates to the discovery that the application of a low emissivity reflective coating to the back surface of a mirror substrate, to compliment the primary reflective/low emissivity coating on the front (mirror) side of the mirror substrate, whether of glass or molded plastic, provides a mirror which is more thermally-stable in the presence of a radiative heat load.

The back coating, which can be of the same or different reflective composition as applied to form the primary reflective mirror coating on the front surface of the substrate, typically reflects between 85.5% to 98.5% of the radiation incident on the surface. Since this energy would be largely absorbed by the back surface, heating of the back surface would result. Reflectance of this energy due to the coating reduces the heating of the back surface, and prevents the normal non-uniform heating of the substrate which normally occurs due to the mismatch in energy being absorbed by a high emissivity uncoated back surface of the substrate and the low emissivity surface on the coated mirror side. Such mismatch normally causes non-uniform heating of the front and back surfaces of the substrate, producing a thermal gradient which can warp or distort the substrate and the precision of the mirror properties, in the case of both contoured and flat mirrors.

THE DRAWING

FIG. 1 illustrates a mirror having improved heat stability and resistance to loss of dimensional stability in the presence of a thermal heat load, produced according to the present invention.

DETAILED DESCRIPTION

Figure 1:
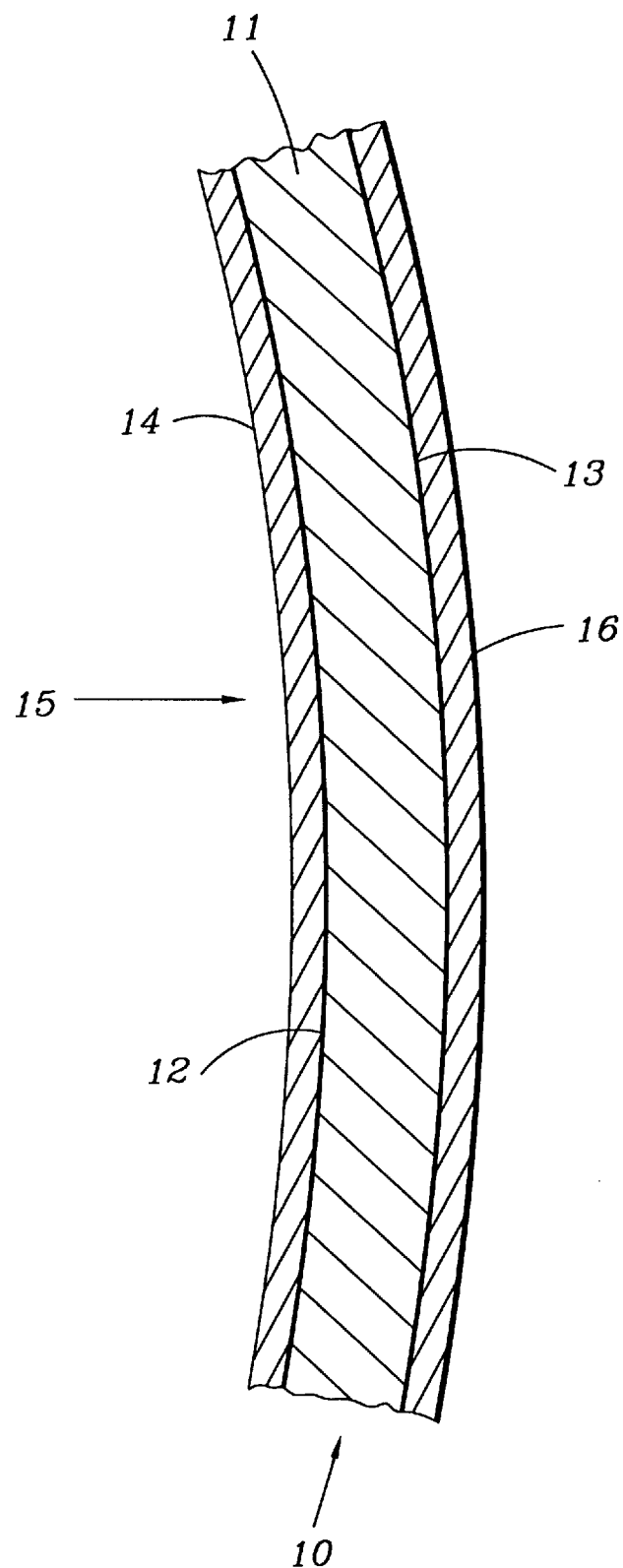

Precision mirrors are used as components of expensive scientific measuring and observation equipment and in low cost optical systems for commercial use, and their accuracy is essential to the results provided by such equipment. The precise shape of such mirrors, whether flat, convex or concave, can be produced from substrates of molded plastic composition but such precision is frustrated if the substrate warps or distorts during use due to poor thermal stability properties of the material.

The novel mirrors 10 produced according to the present invention, as illustrated by FIG. 1, comprise a substrate 11 having a front surface 12 and a back surface 13. A high reflectance, low emissivity, reflective layer 14 covers the front surface 12 of the substrate 11 to provide the mirror side 15 of the mirror 10. A low emissivity reflective layer 16 covers the back surface 13 of the substrate 11, the latter layer 16 reducing the amount of heat energy which is absorbed by the back surface 13 of the substrate to reduce or prevent non-uniform heating of the substrate 11.

The major thermal property for the present mirror substrates injection molded from plastic compositions is their coefficient of thermal expansion (CTE). A low coefficient of expansion results in an optical assembly that is better able to maintain its performance over a wide temperature range. Based on the desire to achieve low thermal expansion, the desired coefficient of expansion for the plastic substrate is in the range of 0.4 to $1.5 \times 10^{-5}$ in/in ° F.

Thermal conductivity also plays an important role in the thermal stability of the substrate material. The larger the coefficient of thermal conductivity the more uniform the temperature of the substrate will be, and therefore, the more uniform the growth. In theory, uniform growth of the substrate due to temperature changes does not cause a reduction in optical performance (with the exception of a corresponding change in the focal length and an inverse change to the field of view). In order to achieve uniform growth due to thermal effects, the entire optical system preferably is made out of the same material. Attention to thermal conductivity is an important issue because plastics are very poor at conducting heat. Generally, plastic materials have coefficients of thermal conductivity between 15 and 100 times lower than aluminum. The need for a low coefficient of expansion is made all the more important by the low thermal conductivity of the plastic materials. A desired thermal conductivity of the mirrors may be achieved with a metalized exterior coating or by using additives to the material.

Such additives are added to the plastic composition as filler material prior to molding. Filler materials are primarily used to add strength to molded plastic substrates. In additional, the coefficient of thermal expansion is generally reduced by the addition of filler materials. Filler materials are also used to enhance a number of other properties, such as resistance to flammability, lubricity, electrical conductivity, and flexibility. Carbon and glass fiber are two of the most common filler materials. Other filler materials such as graphite, cellulose, minerals, and metals are also used, but glass beads are preferred for smooth surface properties. The filler material is generally determinative of the molding process that is used, as well as the rate at which the material can be injected into a mold.

The present invention improves the thermal stability of mirrors by balancing or approximating the radiation-emissivity properties of the front and back surfaces of the mirror to prevent or substantially reduce any temperature differential between the front and back surfaces, such differential or temperature gradient can cause the mirror substrate to warp or undergo slight changes in shape which destroy the precision of the mirror.

While glass substrates are susceptible to such changes when the front and back surfaces thereof are heated to different temperatures, molded clear polymeric substrates, such as of acrylic, polycarbonate, polystyrene, polyetherimide, polyphenylene sulfide, or other plastic molding compositions are more susceptible to such changes because plastic materials generally have a much lower thermal conductivity and a higher coefficient of thermal expansion (CTE) than glass. Thus, heat absorbed at the back surface of a plastic substrate remains localized to cause thermal expansion of the back surface relative to the front surface which can produce a change in the shape of the front (mirror) surface.

The low emissivity coating 16 applied to the back surface 13 of the present mirror substrates 11 can be identical in composition to the low emissivity reflective coating 14 applied to the front surface 12 or mirror side 15, and can be applied in identical manner and simultaneously if desired.

Alternatively, the coating 16 can be a totally different lower cost coating if desired. The typical preferred low emissivity reflective coatings 14 and 16 for both the back and front surfaces 12 and 13 of the present mirror substrates 11 are conventional metallic mirror coatings. There are many suitable coating materials such as of aluminum and chromium, with additional special enhancement layers or protective coating layers. Metallic coatings have high thermal conductivity and equalize the heat uniformity over the entire coated surface. Also conventional thin metallic mirror coatings, as applied by vapor deposition processes, have high reflectivity properties so as to reflect away from about 85.0% to 98.5% of radiation directed thereagainst, including infrared heat energy, and thus permit only from about 1.5% to 15% of radiation directed thereagainst, including heat energy, to pass through the reflective surface and be absorbed to heat the back surface of the substrate.

The low emissivity coatings 14 and 16 preferably are applied simultaneously to both surfaces 12 and 13 of the glass or plastic substrate 11 by supporting the substrate within a vacuum deposition chamber and exposing both surfaces to vapors of a metal, such as aluminum. Alternatively the metal coatings may be applied by other conventional metallization processes such as sputtering, dipping, spraying or other such processes. It is not essential that the low emissivity coatings 14 and 16 applied to the front and back surfaces 12 and 13 of the substrate be of identical composition, or that they have identical low emissivity properties, although such identity is preferable for producing the greatest temperature stability. The rear surface coating 16 may be of less expensive composition and may be applied by less expensive processes than the front mirror coating 14, for economy reasons, so long as it provides substantially lower emissivity than the absence of a back coating. As stated, maximum heat stabilization is obtained if the emissivity of the back coating matches that of the front coating exactly, but any back coating 16 which reduces the emissivity of the rear surface 13 of the substrate will increase the heat stability of the mirror, particularly in the case of plastic substrates with low thermal conductivity and high thermal expansion properties.

It should be understood that the foregoing description is only illustrative of the invention. Various alternatives and modifications can be devised by those skilled in the art without departing from the invention. Accordingly, the present invention is intended to embrace all such alternatives, modifications and variances which fall within claims.

I claim:

1. A mirror operable to reflect incident radiation, said mirror having improved resistance to loss of dimensional stability in the presence of a thermal heat load, said mirror comprising:

a substrate having a first material having a front surface and a back surface, said substrate having a coefficient of expansion in the range of 0.4 to $1.5 \times 10^{-5}$ in/in degree F;

a high reflective, low emissivity, reflective layer covering the front surface of the substrate to provide the mirror side of the substrate; and a low emissivity reflective layer made of a material different than said first material and covering the back surface of the substrate for reducing the amount of heat energy which is absorbed by the back of the substrate to reduce or prevent warping of the substrate in the presence of a heat load, wherein said high reflective, low emissivity, reflective layer covering the front surface of the substrate and the low emissivity reflective layer covering said back surface are the same composition and said front and back surface layers reflect in the range of 85.5 percent to 98.5 percent of said incident radiation.

2. A mirror according to claim 1 in which the reflective layers applied to both the front surface and the rear surface of the substrate have similar low emissivity properties.

3. A mirror according to claim 1 in which said reflective layers comprise vapor-deposited metallic layers.

4. A mirror according to claim 1 in which said substrate made of a first material having a front surface and a back surface comprises an acrylic, polycarbonate, styrene, polyetherimide or polyphenylene sulfide.

5. A mirror according to claim 1 in which said substrate made of a first material having a front surface and a back surface includes a filler material which reduces the CTE of said substrate.

6. A method of forming a plastic mirror operable to reflect incident radiation, said mirror providing reduced warping comprising the steps of:

providing a plastic substrate having a front surface and a back surface, said plastic substrate having a coefficient of expansion in the range of 0.4 to $1.5 \times 10^{-5}$ in/in degree F;

covering said front surface with a high reflective low emissivity layer to provide a mirror surface; and covering back surface with a non-plastic low emissivity second layer for reflecting thermal heat, wherein said high reflectance, low emissivity, layer covering the front surface of the plastic substrate and the low emissivity reflective layer covering said back surface are the same material and said front and back surface layers reflect in the range of 85.5 percent to 98.5 percent of said incident radiation whereby warpage of said plastic mirror in the presence of a thermal heat load is reduced.

7. The method of claim 6 wherein said second layer comprises a metallic layer.

8. The method of claim 6 wherein the steps of covering said front and back surfaces with said layers occurs at the same time.

9. An improved plastic mirror, operable to reflect incident radiation, said mirror of the type comprising a plastic substrate of a first material having a front and back surface and a high reflectance low emissivity layer overlying said front surface for providing a mirror surface, the improvement comprising:

a high reflectance low emissivity layer of a second material overlying said back surface for reflecting thermal heat whereby warpage of said plastic mirror is reduced, wherein said plastic substrate has a coefficient of expansion in the range of 0.4 to $1.5 \times 10^{-5}$ in/in degree F, and where said back surface layer reflects in the range of 85.5 percent to 98.5 percent of said incident radiation.

* * * * *